Jan. 5, 1937. C. T. HATCH 2,066,623
BREAD RACK
Filed Nov. 14, 1935 2 Sheets-Sheet 2

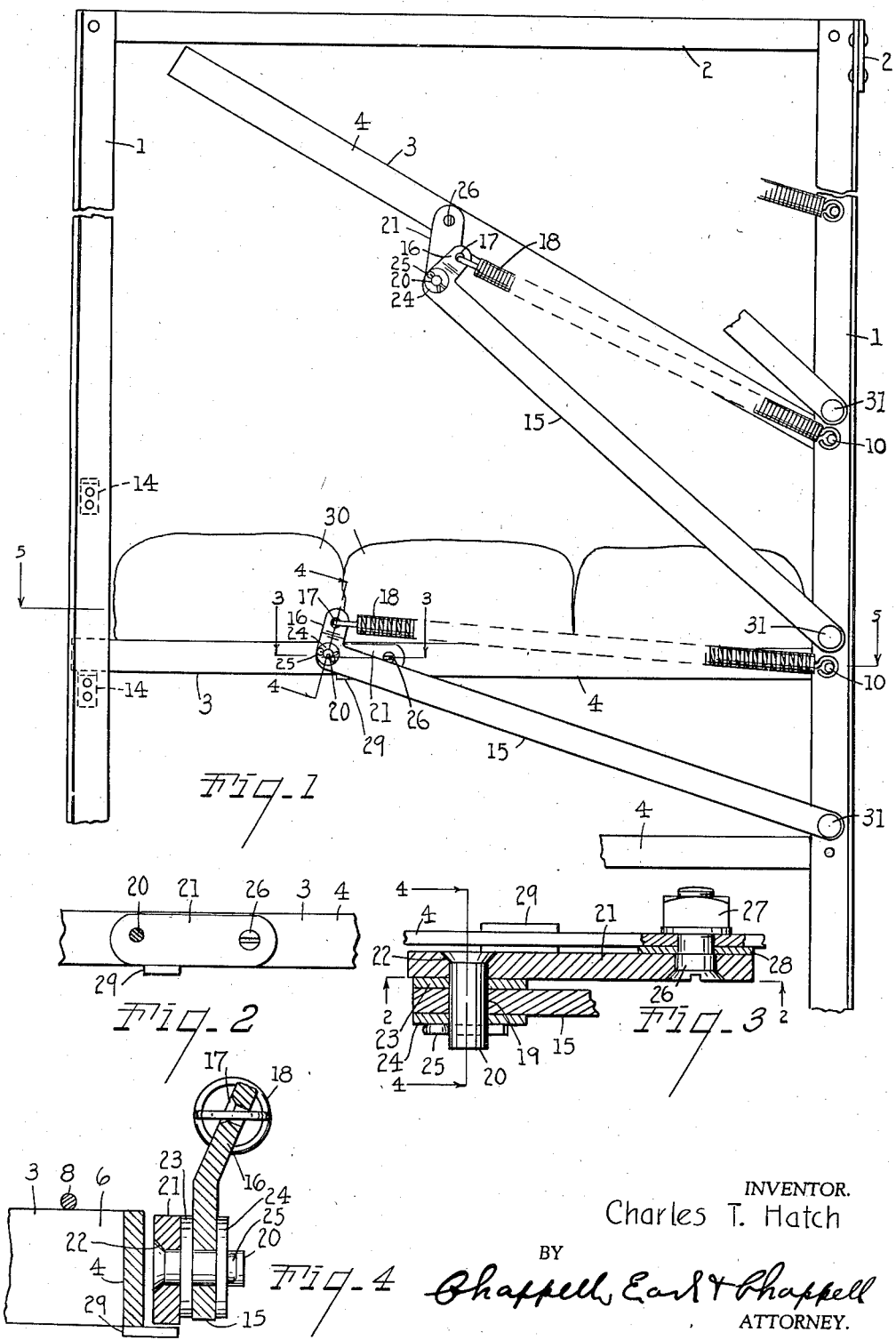

INVENTOR.
Charles T. Hatch
BY
Chappell, Earl & Chappell
ATTORNEYS

Patented Jan. 5, 1937

2,066,623

UNITED STATES PATENT OFFICE 2,066,623

BREAD RACK

Charles T. Hatch, Albion, Mich., assignor to Union Steel Products Company, Albion, Mich.

Application November 14, 1935, Serial No. 49,749

8 Claims. (Cl. 211—150)

The main objects of my invention are:

First, to provide a bread rack suitable to hold loaves of bread during cooling thereof, characterized by a plurality of shelves readily swingable about the rear edges thereof from a horizontal article receiving position into inoperative position.

Second, to provide a rack having spring urged pivoted shelves which in horizontal erected position are locked against inadvertent jarring from said position.

Third, to provide a device characterized by the simplicity and cheapness of its construction, yet being efficient and easily operated.

Objects relating to details and economies of my invention will definitely appear from the description to follow. The invention is defined in the claims.

I have produced a rack which is suitable for use by baking companies or bakers primarily, although it will be obvious that it is not restricted to that field of employment, finding ready application wherever it is desired to have considerable space available for the shelving of articles. Bread racks of the type of my invention are customarily provided with rollers by means of which they may be shifted at will from one position to another. It is well known in racks of the type described to provide a plurality of pivoted shelves which are capable of being raised when not in use, or lowered into an erected or operative position so that access may be had successively thereto for placing or removing articles such as loaves of bread for temporary storage thereon. Difficulties of such known racks have existed in the fact that the shelves were not readily liftable into inoperative position or if so lifted would not remain in that position or were too readily displaced from their erected horizontal position by jars or jolts incurred during the moving of the rack from one place to another.

By the device of my invention, I have produced a rack embodying shelves which are locked in erected position against accidental upward displacement about their pivotal point, yet which may readily be displaced from such locked position by a slight lifting force applied at their free ends. The locking action is a positive one and is not merely dependent upon the relative dimensions or weights of parts, yet as aforesaid may be readily overcome.

A structure which is a preferred embodiment of my invention is illustrated in the accompanying drawings, in which:

Fig. 1 is a fragmentary end elevational view of my device illustrating various positions of shelves therein.

Fig. 2 is a fragmentary view taken on the line 2—2 of Fig. 3.

Fig. 3 is an enlarged fragmentary sectional view taken along a line corresponding to line 3—3 of Fig. 1.

Fig. 4 is a fragmentary sectional view taken along the line 4—4 of Figs. 1 and 3.

Figure 5:
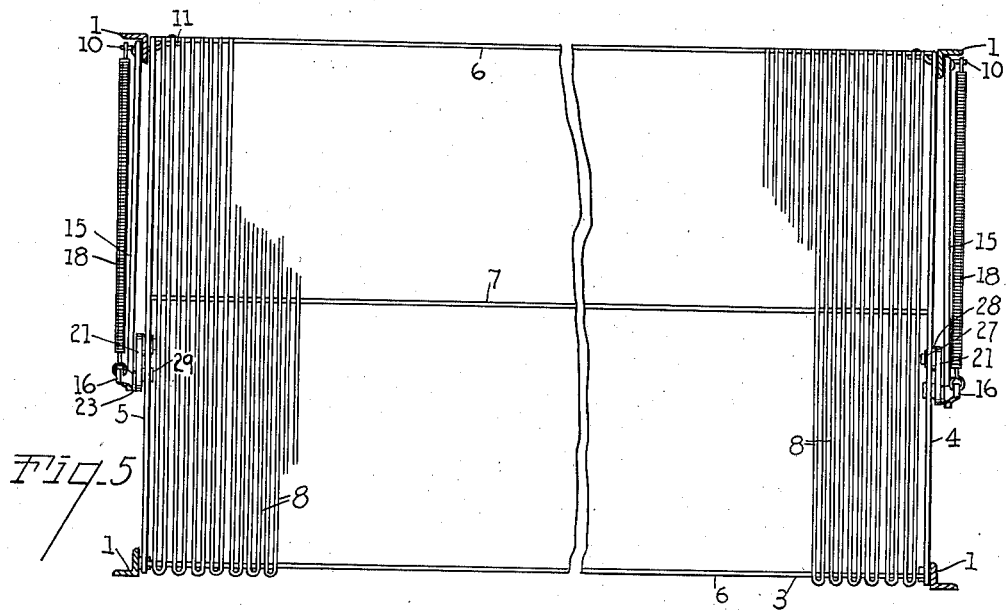
Fig. 5 is a sectional plan view illustrating a single shelf and structure associated therewith, taken along the line 5—5 of Fig. 1.
Figure 6:
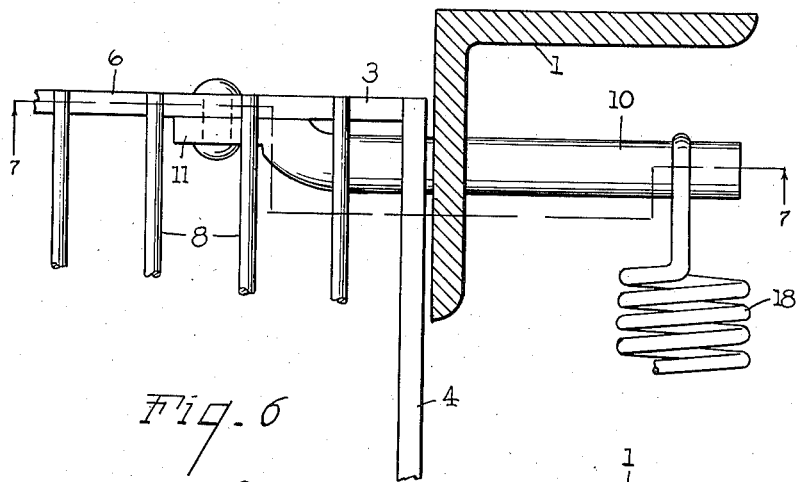
Fig. 6 is an enlarged fragmentary view partially in section, illustrating the manner of pivoting the shelves to the framework of my rack.

Referring to the drawings, the rack of the embodiment of my invention illustrated comprises a frame made up of four vertical uprights 1 suitably connected at front, rear and sides at the top and bottom thereof by cross bars 2. It will be understood that the rack if designed to be portable is provided with rollers at the bottom thereof, which are not shown, whereby the rack may be rolled into whatever position may be desired.

Figure 7:
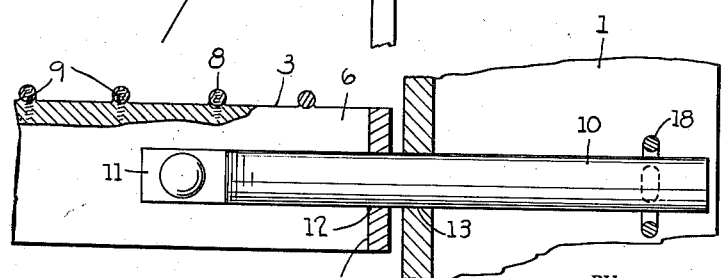
Fig. 7 is a sectional view taken along the line 7—7 of Fig. 6.

Mounted for pivotal movement in the frame, I dispose a plurality of shelves 3 which are formed of end members 4, 5 joined by front and rear longitudinal members 6, the shelves being reinforced by intermediate longitudinal bars 7. Transversely of the shelf 3, I space grid wires or rods 8 which, in the embodiment shown are of U shape, the bights thereof being disposed at the front of the shelf to provide a receiving end whereby articles presented to the shelf are not likely to become caught or snagged. The rods 8 are attached to the front and rear members 6 in any suitable manner, preferably by a spot weld indicated at 9 in Fig. 7.

The shelves 3 are pivotally mounted to the rear uprights 1 by means of pintles or pivots 10 which are provided with flattened offset portions 11 riveted to rear frame member 6 of the shelf and extending through holes 12 drilled in the end members 4, 5 of the shelf and holes 13 drilled in the rear uprights 1 to provide bearings for the pivots. I suitably attach angled lugs 14 to front uprights 1 for the purpose of supporting the free front ends of the shelves when they are in horizontal erected position.

At suitably spaced locations vertically of the rear uprights, I pivotally mount arms 15 at one end to the uprights. At the opposite free end, each of the arms 15 is provided with an offset extension or portion 16 having a hole 17 in which is engaged one end of a spring 18. The opposite end of the spring is hooked about the end of pivot 10 of the shelf with which the spring is associated. Adjacent the offset extension 16, arm 15 is provided with a hole 19 to receive a pivot 20 which pivotally joins the arm to a link 21, the link having a countersunk hole 22 therein to likewise receive the pivot. A suitable spacing washer 23 is interposed on pivot 20 between the arm and link and another spacing washer 24 is interposed on the pivot between the arm and a cotter pin 25 which secures the link and arm on pivot 20 for free pivotal movement thereon with respect to one another.

At its opposite end, link 21 is pivotally connected to side member 4 of shelf 3 by means of a flat-headed bolt 26 and a nut 27 and washer thereon. Link 21 is countersunk to receive the bolt head and a suitable spacing washer 28 is interposed between shelf end member 4 and link 21. At the bottom thereof, link 21 has welded thereto a stop plate 29 which engages the under side of the shelf end member 4 when the parts are in erected position. Link 21 is freely swingable at both its pivotal points with respect to arm 15 and end member 4 of shelf 3, except as limited by the stop. The structure just described is duplicated at opposite ends of the rack.

In the above arrangement of parts, let it be assumed that a shelf 3 is in horizontal erected position. Referring to Fig. 1, this position is shown by a shelf supporting three rows of loaves of bread 30. In this position of parts, arm 15 is urged for rotative movement about its pivotal point 31 on upright 1 by spring 18. However, in view of the fact that the pivot 20 lies in or slightly above the plane of the pivot 10 and bolt 26, a locking toggle is provided, locking the shelf in horizontal position. If it is desired to raise one of the shelves into the inoperative position in which the upper shelf illustrated in Fig. 1 is placed, the shelf is manually lifted a slight extent, whereupon pivotal point 26 is raised, thus breaking the toggle existing between shelf 3, link 21, and arm 15, whereupon the rotative motion imparted to arm 15 by spring 18 is made effective to exert a pull on link 21 in a direction toward pivot point 26 and this pull swings the link upwardly, straightens the toggle link 21 and elevates the shelf.

It will be understood that springs 18 are selected with reference to the weight of the shelves 3 so that the raising and lowering of the same will be accomplished without objectionable impacts either in upper inoperative or lower erected horizontal position. The proper size of spring having been selected with these requirements in mind, it will be found that shelves 3 may be lowered to horizontal position against stops 14 and that in such position the shelves will be positively locked by the toggle formed by the cooperating parts. The extent of such locking action may be readily controlled by proportioning the dimension and pivotal relation of the parts in a manner which will be obvious, so that any degree of resistance to accidental upward displacement of the empty shelves may be achieved; however, in any event, the locking action is a positive one.

I have illustrated and described my improvements in an embodiment which I have found very practical. I have not attempted to illustrate or discribe other embodiments or adaptations as it is believed this disclosure will enable those skilled in the art to embody or adapt my improvements as may be desired.

Having thus described my invention, what I claim as new and desire to secure by Letters Patent is:

1. In a rack, a frame, shelves pivoted to said frame, arms pivotally mounted on said frame, springs connecting said arms and said frame, and links connecting said shelves and said arms, stops carried by said links, said stops being engaged with said shelves in horizontal erected position thereof to limit downward movement of the shelves, the arms and links constituting a toggle whereby said shelves are locked against movement by said springs, said springs, upon upward initial pivotal movement of said shelves, exerting force transmitted through said links to further elevate the shelves.

2. In a rack, a frame comprising front and rear pairs of uprights, shelves pivoted to said rear uprights, arms pivotally mounted on said rear uprights and having offset portions at the free ends thereof, springs connecting said offset portions and said rear uprights, and links connecting said shelves and said arms adjacent the free ends thereof, said springs exerting force transmitted through said links to elevate the shelves after the shelves have been initially unlocked from their erected position.

3. In a rack, a frame comprising a plurality of uprights, a plurality of shelves pivoted to said uprights, means to resiliently urge said shelves from horizontal operative or erected position into elevated inoperative position after the shelves have been initially unlocked from erected position, and means for maintaining said shelves in erected position in opposition to said urging means, comprising links operatively associated with said urging means and said shelves and constituting a toggle joint therebetween, said joint being adapted to be broken by slight elevation of said shelves, and means to limit downward movement of said shelves.

4. In a rack, a frame, a shelf pivoted to said frame, means to resiliently urge said shelf from operative or erected position into inoprative position after said shelf has been initially unlocked from erected position, and means for maintaining said shelf in erected position in opposition to said urging means, comprising a link operatively associated with said urging means and said shelf and constituting a toggle joint therebetween, said joint being adapted to be broken by slight movement of said shelf.

5. In a rack, a frame, a shelf pivoted to said frame, means to resiliently urge said shelf from operative or erected position into inoperative position, and means for maintaining said shelf in erected position in opposition to said urging means, comprising a link operatively associated with said urging means and said shelf.

6. In a rack, a frame, a shelf pivoted to said frame, means to resiliently urge said shelf from operative or erected position into inoperative position, and means for maintaining said shelf in erected position in opposition to said urging means comprising a toggle joint adapted to be broken by slight movement of said shelf from its erected position.

7. In a rack, the combination with a frame, of a shelf pivoted to said frame adjacent its rear edge, an arm pivoted at its rear end to said frame below the axis of the shelf, said arm being upwardly offset at its front end, a link pivoted to said shelf and to the front end of said arm and provided with a shelf engaging stop limiting its upward swing when the shelf is in erected horizontal position, the pivot for the link to the shelf then being at the rear of the pivot for the link to the arm, and a spring mounted at its rear end in approximately the plane of the shelf axis and engaged at its front end with the upwardly offset end of said arm, the pivots of the parts being so arranged relative to the pull of the spring that the parts constitute a locking toggle when the shelf is in erected position.

8. In a rack, the combination with a frame, of a shelf pivoted to said frame adjacent its rear edge, an arm pivoted at its rear end to said frame below the axis of the shelf, a link pivoted to said shelf and to the front end of said arm and provided with a shelf engaging stop limiting its upward swing when the shelf is in erected horizontal position, the pivot for the link to the shelf then being at the rear of the pivot for the link to the arm, and a spring mounted at its rear end in approximately the plane of the shelf axis and engaged at its front end with the arm, the pivots of the parts being so arranged relative to the pull of the spring that the parts constitute a locking toggle when the shelf is in erected position.

CHARLES T. HATCH.